United States Patent [19]

Bachmann et al.

[11] Patent Number: 4,821,507
[45] Date of Patent: Apr. 18, 1989

[54] GAS FLOW DIVERTER

[75] Inventors: Lothar Bachmann, Auburn; William F. Koch, Lewiston, both of Me.

[73] Assignee: Bachmann Industries, Inc., Lewiston, Me.

[21] Appl. No.: 55,594

[22] Filed: May 29, 1987

[51] Int. Cl.$^4$ .......................... F02C 6/00; F16K 1/16
[52] U.S. Cl. .................... 60/39.182; 137/875
[58] Field of Search ........................ 60/39.182, 39.181; 137/875, 872, 870, 862, 527.6; 126/285 R; 110/163

[56] References Cited

U.S. PATENT DOCUMENTS

| | | | |
|---|---|---|---|
| 1,180,817 | 4/1916 | Ballard | 137/875 |
| 2,605,076 | 7/1952 | Tanke | 137/875 |
| 3,805,884 | 4/1974 | Burt et al. | 137/875 |
| 3,897,773 | 8/1975 | Burt et al. | 137/875 |
| 4,027,654 | 6/1977 | Kannapell | 110/163 |
| 4,582,296 | 4/1986 | Bachmann | 251/250 |

OTHER PUBLICATIONS

G. F. D.-Gas Flow Diverter Systems, Bachmann Industries, Inc.

Primary Examiner—Donald E. Stout

[57] ABSTRACT

A gas flow diverter receives large volumes of hot gases from a gas turbine and has a blade adapted to close either the outlet port to a heat recovery steam generator or the outlet port to the stack. Each port is surrounded by an open channel the two side walls of which are each provided with a seal with both exposed, one beyond the other. The surfaces of the blade are stainless steel cladding and are connected through insulation to a reinforcement in a manner permitting but confining the expansion of the cladding. The frame has a border providing first and second ledges on each side which are spaced and positioned so that each may engage a different one of the two seals bordering an outlet port when closed thus establishing the channel as a closed passageway surrounding the closed port which may be sealed against leakage by discharging sealing air into it. The blade is shifted between its two operative positions by means of a reversible drive including toggle joints connected to the blade reinforcement by a unit which is shiftable in response to forces exerted by the expanding or contracting toggle joints.

18 Claims, 8 Drawing Sheets

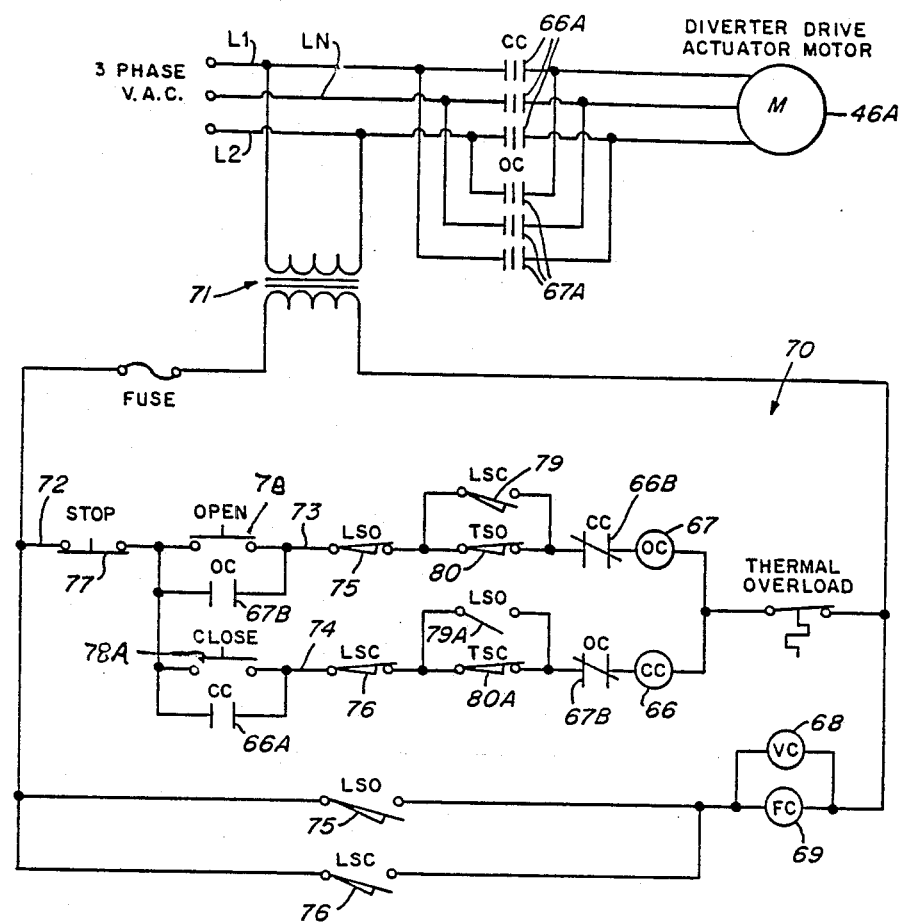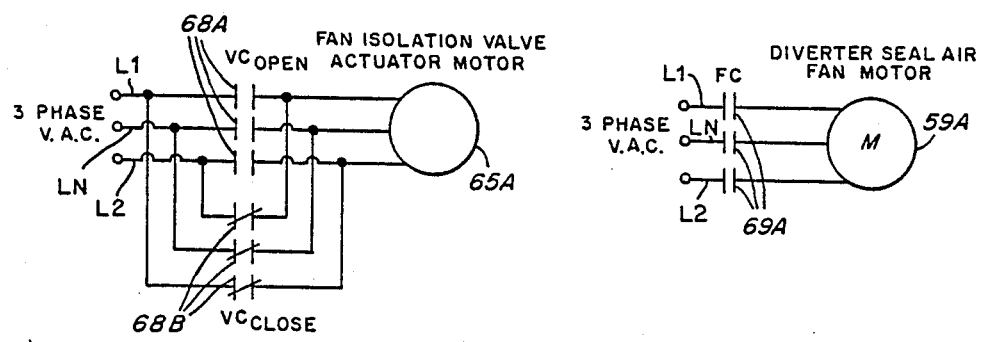
Fig. 12

GAS FLOW DIVERTER

BACKGROUND OF THE INVENTION

Gas flow diverters are employed to deliver hot exhaust gases from a turbine either to a heat recovering steam generator or to the stack. Many problems are attendant their use due to the large volumes of gases at high temperatures and under substantial pressure that are exhausted by turbines and the necessity that the hinged gas diverter blade be swung into and out of its operative positions relative to the stack and to the steam generator without vibrating and without causing thermal shock on the system. Such diverters are large as are the conduits leading threfrom to the steam generator or to the stack and as the conduit to the steam generator must be capable of being safely entered by service personnel, leakage into it must be prevented when gas flows are diverted to the stack in order to avoid the necessity of placing the turbine out of service.

As far as we are aware, gas flow diverters have not been fully satisfactory with respect to blade functions and have not been capable of ensuring zero gas leakage under all conditions.

THE PRESENT INVENTION

The general objective of the present invention is to provide gas flow diverters capable of functioning properly under all conditions.

One aspect of the invention is to ensure that, with a diverter for delivering large volumes of has hot under considerable pressure from a gas turbine through outlet ports either to a heat recovering steam generator or to the stack, no leakage through a closed port will occur.

To that end, each port is surrounded by a channel each portion of which opens toward the other portions thereof and which has one wall longer wider then the other with the shorter wall exposed and spaced inwardly with respect to the longer wall. The longer and shorter walls of the channels carry, respectively, first and second seals. The blade, mounted in the diverter to swing between positions in which either outlet port is closed, has its sides clad with stainless steel and separated by a thermal barrier. The blade has a bordering frame shaped and dimensioned to provide marginal portions at each side of the frame having first and second ledges or seats for engagement, respectively, with the first and second seals bordering an outlet port.

Another aspect of the invention is to provide a blade in which the expanding effect of the high temperatures to which the stainless steel surfaces are exposed are accommodated. To achieve that objective, blades are provided having reinforcements between insulation underlying and covered by their clad surfaces. Each such blade has the cladding on each side connected through the insulation to the reinforcement. Such connections are pins welded to the reinforcement and extend through the insulation and holes in the cladding and provided with retainers.

An important aspect of such a blade is that holes through the cladding may be slots or oversized holes closed by the retainers but permitting expanding movements of the cladding. With the holes including first and second series of aligned slots disposed of right angles to each other and intersecting at the center of the cladding and with a substantial number of series of equally spaced, oversize holes, extending radially with respect to the center of the cladding, expansion of the cladding is permitted but well confined.

The preferred manner in which the blade is swung between its two operative positions is by toggle joints having links connected to the drive shaft of a reversible drive. With the drive shaft so located that the force of the toggle joints is applied at or close to the transverse center line of the blade, moments in the blade effecting fluttering and bowing are reduced and also finite modulation capabilities are provided.

The use of toggles to effect the swinging of the blade from one operative position to the other requires that they be exposed in an outlet port, preferably the outlet port to the stack, and hence they are exposed to the high temperature of the gas when the other outlet port is closed. In order to minimize the effect of such exposure of the toggle joints, each is connected to a unit which has a base plate anchored to the reinforcement of the blade and provided with two pairs of bolts pivotally connected to the base plate. The pairs of bolts are spaced apart and extend through a second plate which serves to back springs through which the bolts extend and which are held compressed by nuts threaded on the bolts. A toggle joint link is pivotally connected to the second plate which has a pivotal connection with the base plate so that such units are free to enable the pivotal connection of the toggle joint therewith to shift in response to the expansion and contraction forces.

An essential objective of the present invention is that of having diverters capable of providing zero gas leakage through a closed outlet port. Due to the provision of channels surrounding the outlet ports and provided with first and second seals, a surrounding passageway is provided when the ledges of the gate engage the seals of either outlet port. Sealing air from a blower into a thus established passageway ensures zero leakage of gases through the engaged seals. In practice, not only is the operation of the blower interrupted during the interval the blade is being moved but also, during that interval, the conduit is blocked through which air from the blower is delivered into such an established passageway for sealing air.

Other objectives and advantages of the present invention will be apparent from the following description of a preferred embodiment and the appended claims.

BRIEF DESCRIPTION OF THE DRAWINGS

The accompanying drawing illustrate a preferred embodiment of the invention and

FIG. 12 is a schematic view showing the blade control circuitry.

THE PREFERRED EMBODIMENT OF THE INVENTION

Figure 1:
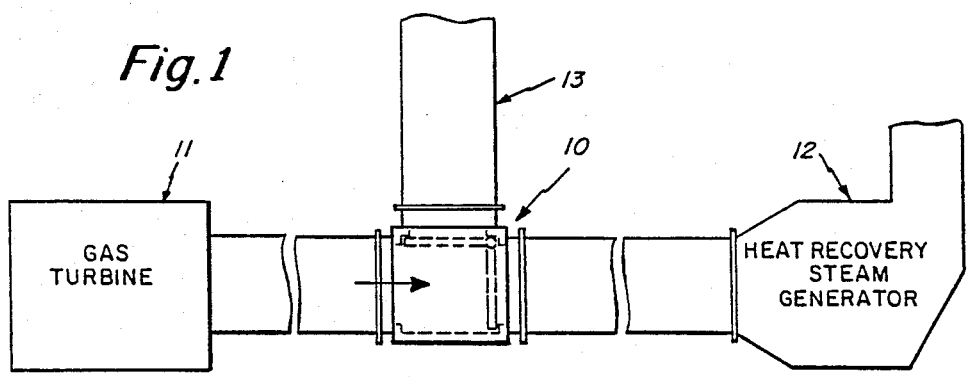
FIG. 1 is a somewhat schematic illustration of a typical installation of a diverter.
Figure 2:
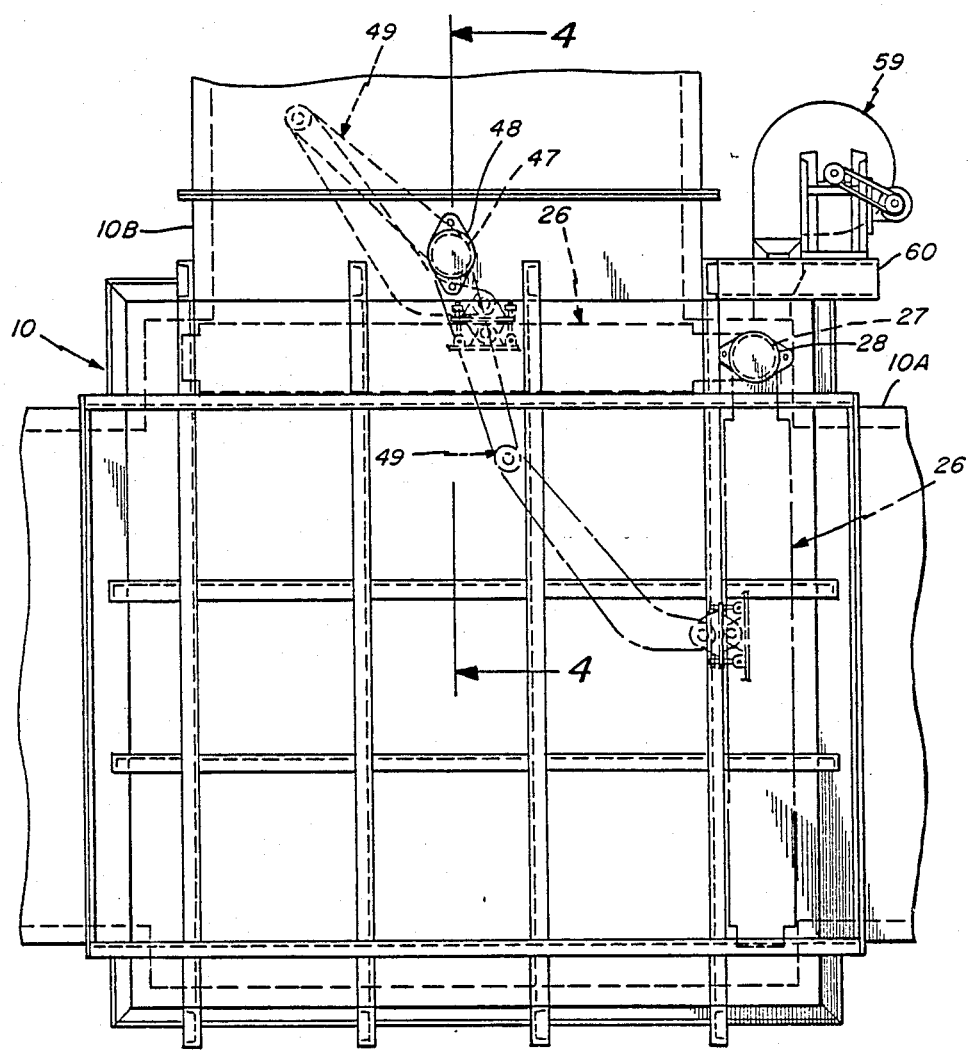
FIG. 2 is a side view of the diverter.

A gas flow diverter in accordance with the invention is generally indicated at 10 and is shown in FIG. 1 as connected to the exhaust of a gas turbine 11 and operable to deliver the large volume of hot exhaust gas therefore either to a heat recovery system generator 12 or to the stack 13.

Figure 7:
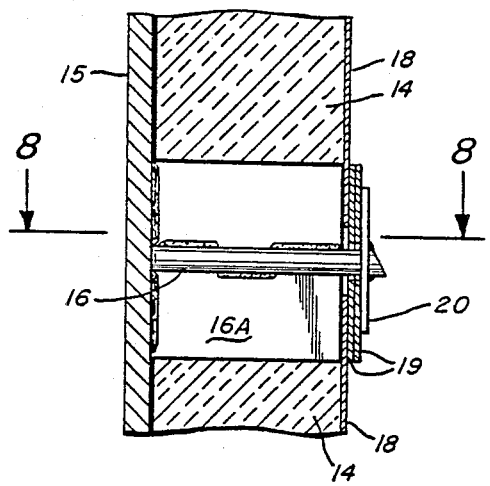
FIG. 7 is a section illustrating the connection of insulation panels to the interior surface of the diverter.
Figure 8:
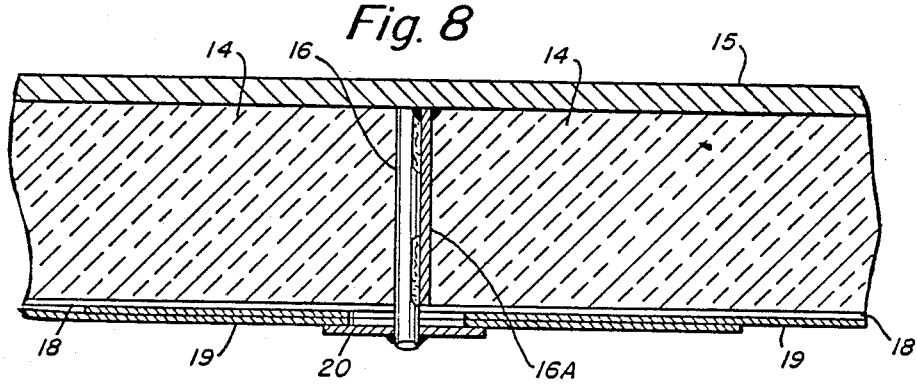
FIG. 8 is a section taken approximately along the indicated line 8—8 of FIG. 7.
Figure 9:
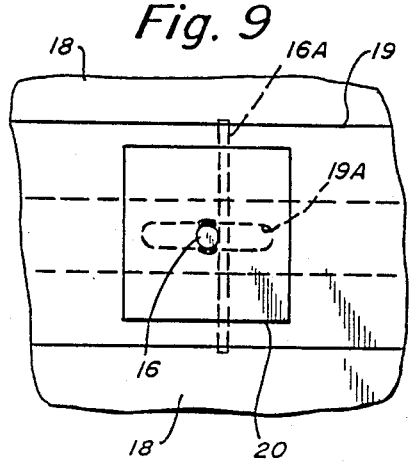
FIG. 9 is a fragmentary plan view of the cladding showing the anchoring of adjacent corners of cladding sections.
Figure 10:
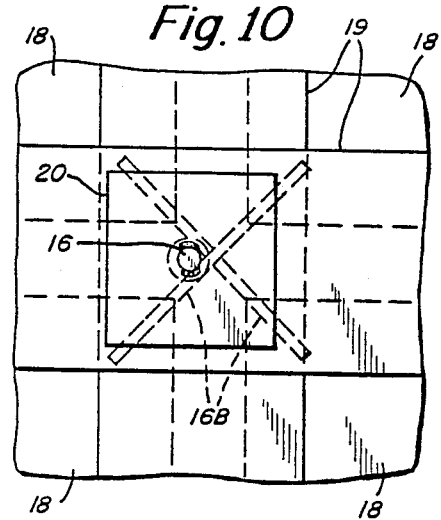
FIG. 10 is a like view illustrating the anchoring of the sides of adjacent cladding sections.

The gas flow diverter 10 is shown as generally cubical and as externally reinforced as may be required by a particular installation if the weight of the stack 13 is to be borne thereby. The interior surfaces of the diverter and its ports are lined with insulation in the form of abutting panels 14 of a material adapted to withstand temperature of 1200° F. or higher. The panels 14, see FIG. 7–9, are anchored to the walls 15 of the diverter by means of pins 16 welded to the interior surface thereof. Each panel 14 is covered by a stainless steel liner 18 with the liners so dimensioned that there are gaps between them which permit their expansion. The pins 16 extend through stainless steel strips which overlap the gaps between the liners and the strips 19 are held in positions securing the panels 14 by retainers 20. Between adjacent sides of the liners, the pins 16 extend through slots 19A in the strips 19 and have wings 16A overlying the liner margins. At the corners of the panels, see FIG. 10 the pins extend through oversized holes in the strips 19 and have wings 16B in the form of a cross to overlie all four liners. If the panel size warrants the use of central anchoring means pins 16 are employed for that purpose and extend through such panels and their liner 18 and are provided with overlapping retainers 20.

The diverter port 10A in communication with the heat recovery steam generator and the diverter port 10B in communication with the stack 13 are each surrounded by a square frame 21 which is U-shaped in cross section with the channels of the four sides opening towards each other in the same plane. One channel wall of each frame is longer or wider than the other and is seated against the insulation surrounding the appropriate one of the outlet ports. Each frame 21 is held in place by clips 22 located in recesses in the insulation spaced about the port which it surrounds and welded to the walls 15 of the diverter. In practice, see FIG. 6, headed connectors 23 extend through oversize holes in the clips and are anchored to the frames 21 thus enabling frame expansion to be accommodated. The heads of the connectors cover the holes in the clips at all times.

The frame walls seated against the insulation and the shorter or narrower walls both have stainless steel seals 24 secured to their outer ends. Each seal 24, see FIG. 6, consists of first and second resilient strips 24A and 24B, respectively, held apart by a spacing strip 25 through which the strips 24A and 24B are bolted to a frame 21. The first strips 24A are flat and the second strips 24B are so bent lengthwise so as to engage and yieldably back the outer ends of the first strips 24A.

The blade of the diverter is generally indicated at 26 and is connected to a transverse pivot shaft 27 located within the diverter in a position between the ports 10A and 10B such that the blade may close either port as it is swung in one direction or the other. The ends of the pivot shaft 27 extend through the side walls of the diverter and are heldby bearings 28 attached thereto.

The blade 26 has a plurality of spaced parallel tubular members 29 which are rectangular in cross section with the number of such members depending on the dimensions of the blade. In the disclosed embodiment there are but two members 29 as is typical of a blade approximately ten feet square. One end of each member 29 is welded to the pivot shaft 27 and adjacent said ends, sections of an end wall 30A are welded thereto to establish one side of a square reinforcing frame the other sides 30B of which are of U-shaped stock disposed with their channels opening outwardly. The other ends of the members 29 are secured to the frame side opposite the the plate 30A. thereto which are also welded to the pivot shaft 27.

Figure 4:
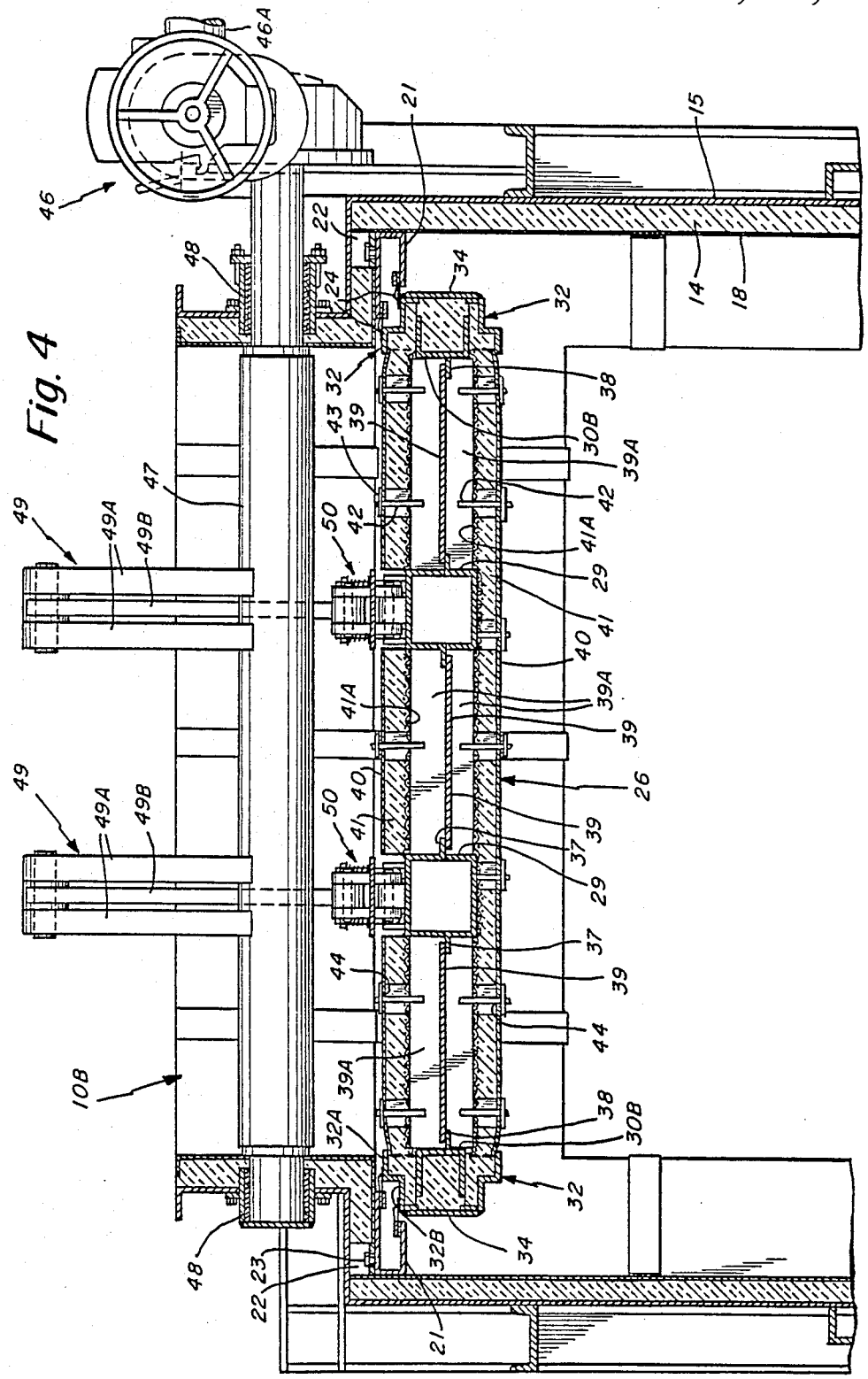
FIG. 4 is a section on a substantial increase in scale taken approximately along the indicated line 4—4 of FIG. 2.
Figure 5:
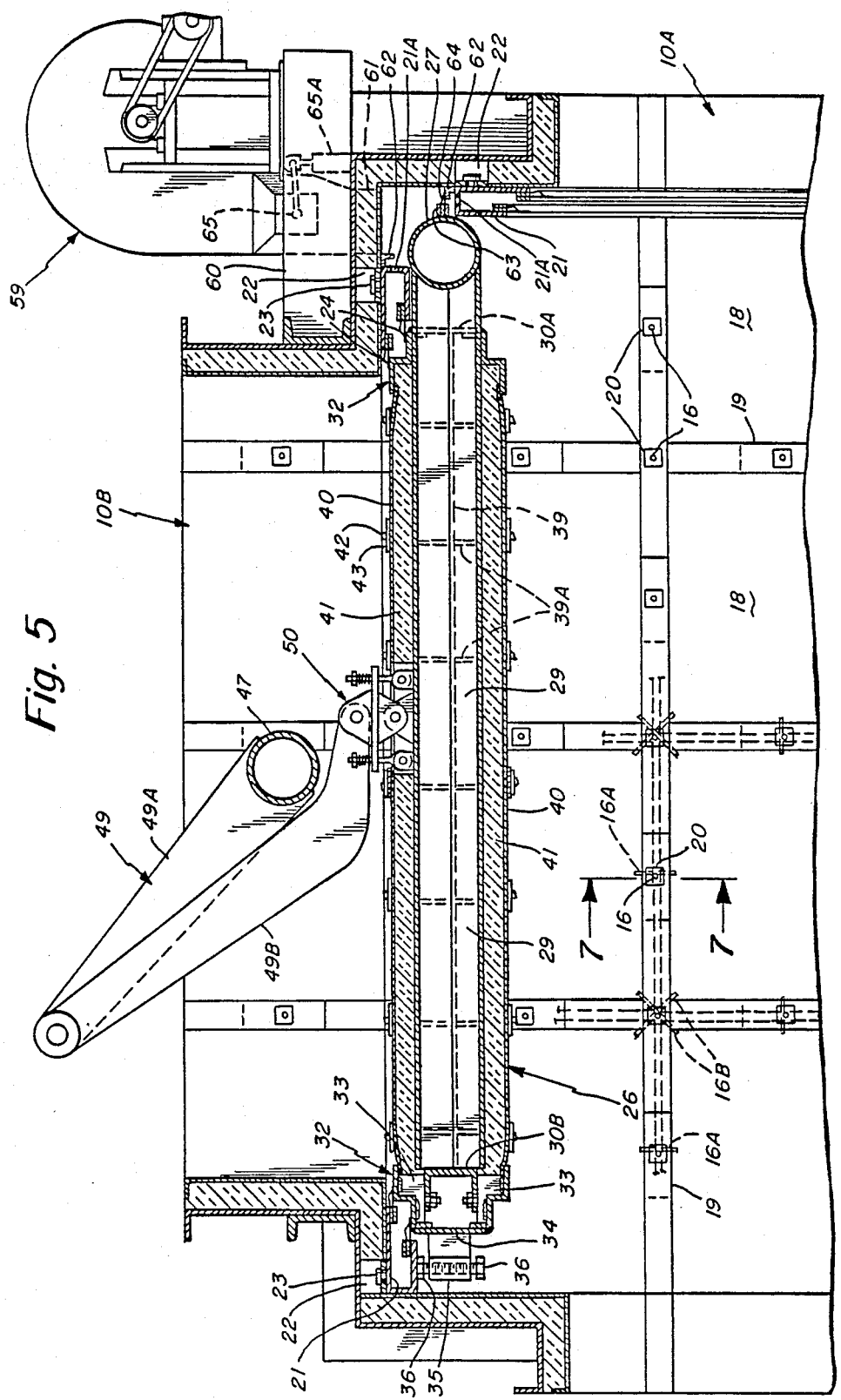
FIG. 5 is a section taken approximately along the indicated line 5—5 of FIG. 3.
Figure 6:
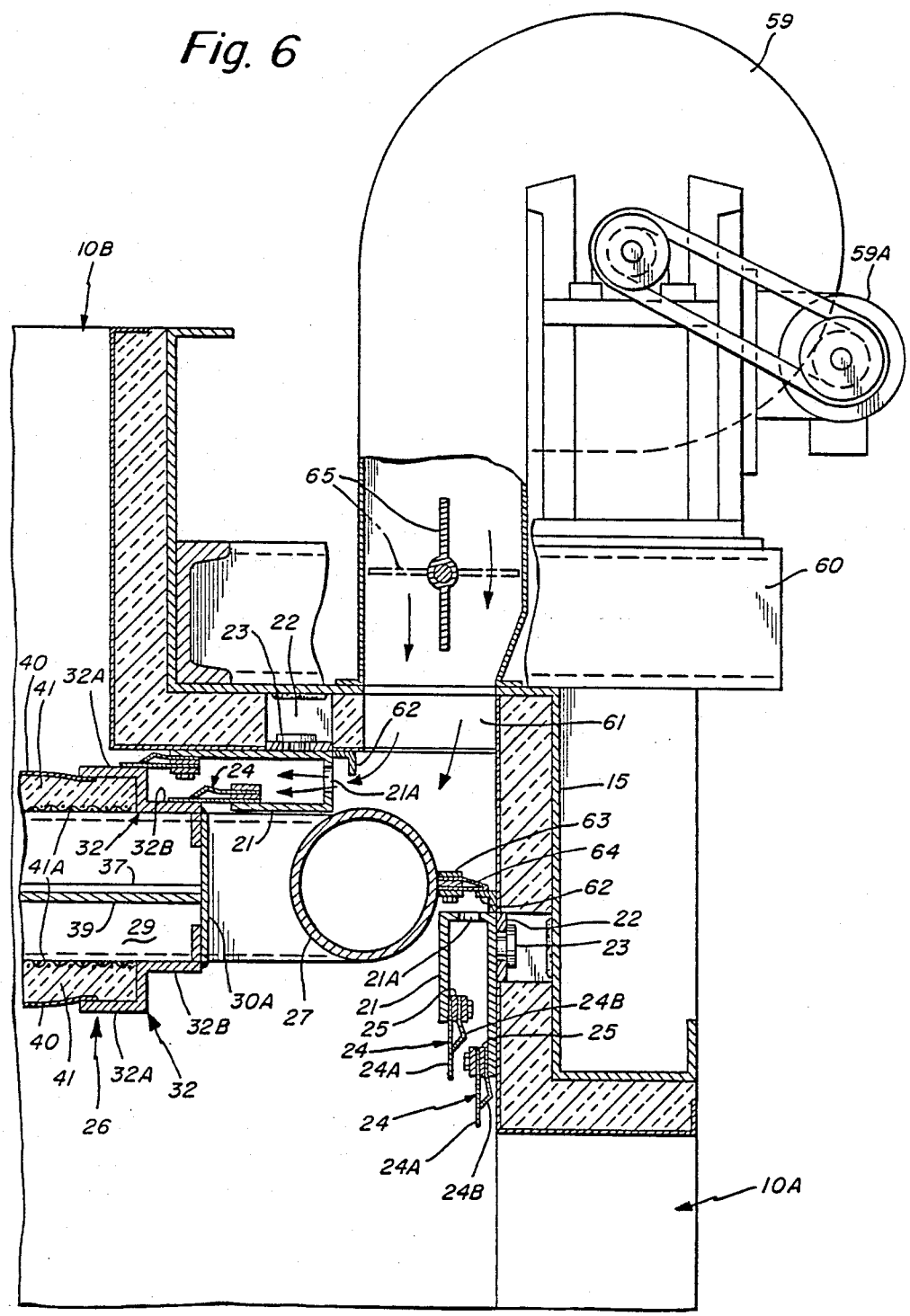
FIG. 6 is a section, on a further increase in scale taken approximately along the indicated line 6—6 of FIG. 3.

The blade 26 has a pair of spaced apart, marginal frames generally indicated at 32 which, see FIGS. 4 and 5, are shaped and dimensioned to provide first and second ledges 32A and 32B, see FIG. 6, respectively, spaced one from the other in a manner such that each of them seats against the appropriate one of the seals 24 of a frame 21 when the blade 26 is positioned to close the port surrounded by that frame. One marginal frame 32 provided sealing ledges for engagement with the two seals 24 surrounding the port 10A and the other marginal frames 32 provides sealing ledges for engagement with the two seals surrounding the port 10B.

The frames 32 are shown as connected to the three sides of the internal frame by means of brackets 33 which are welded thereto. The brackets 33 of one frame 32 are connected to one of the walls of the U-shaped sides of the reinforcing frame and the brackets 33 of the other frame 32 are similarly connected to the other walls of said sides. The space between the two frames thus connected to the members 30B are closed by plates 34. Along the sides of the internal frame adjacent the pivot shaft 27, the frames 32 are supported by opposite sides of the tubular members 29 and are welded to opposite margins of the plate 30A. The opposite side of the frame has mounts 35 into both ends of which adjustable stops 36 are threaded for engagement with the appropriate one of the frames 26.

Reference is made to FIG. 4 wherein the members 29 are shown as having centrally located, lengthwise flanges 37 extending along each side and the inner surface of the U-shaped sides 30B of the reinforcing frame have co-planar flanges 38. The flanges 37 and 38 have tie plates 39 connected thereto with the central plate 39 shown as positioned on the side of the flange opposite to those against which the other two plates 39 are seated.

The blade 26 is completed by surface layers 40 of stainless steel of a thickness suitable for cladding and each layer 40 covers an insulating boards supported by expanded wire mesh 41A.

Figure 3:
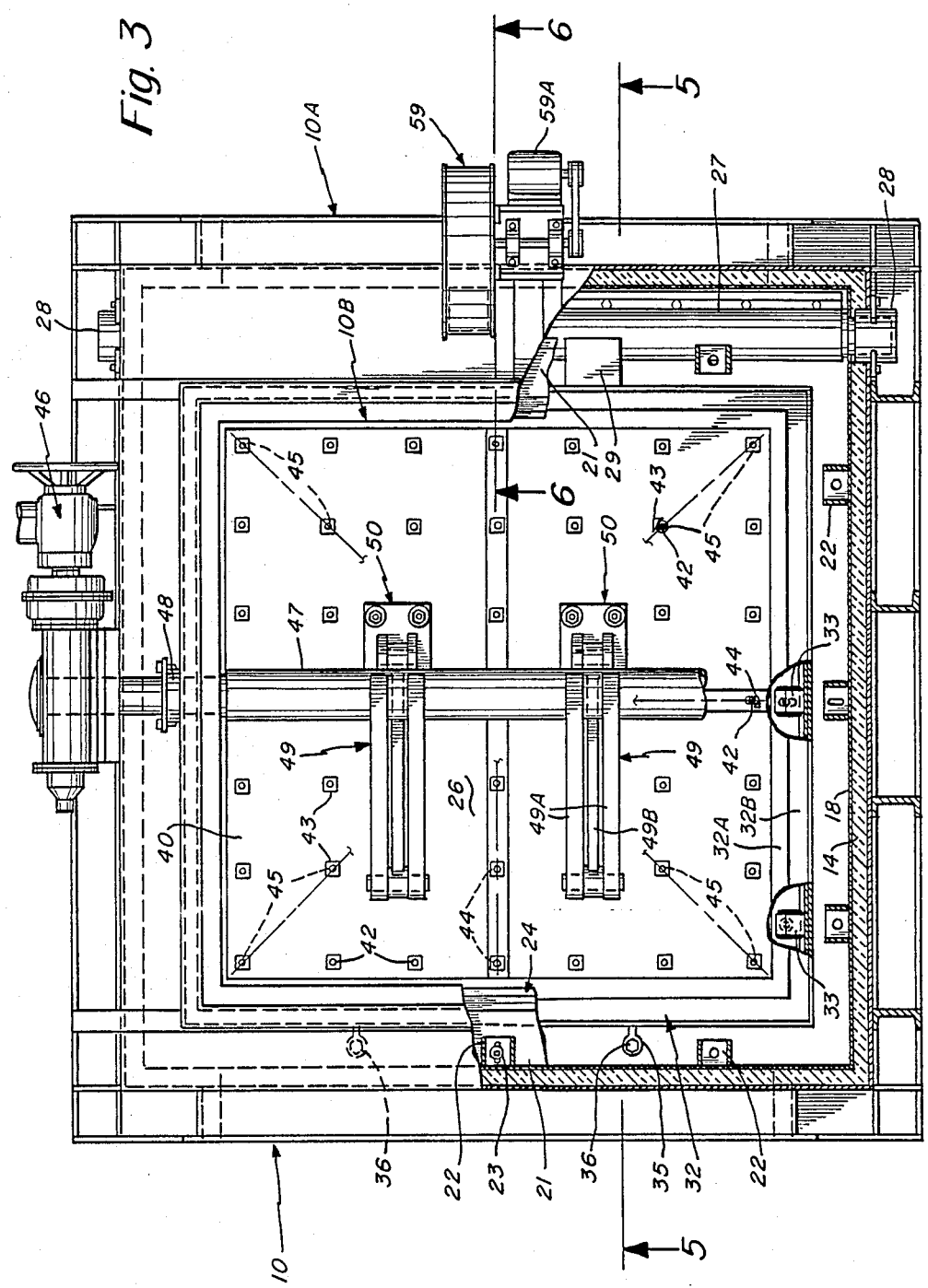
FIG. 3 is a partly sectioned plan view of the diverter.

Each cladding layer 40 is connected through the board 41 which it covers to walls 39A on the plates 39 by means of pins 42 welded thereto. The pins 42 extend through holes in the cladding layer 40 and are provided with hole covering retainers 43. The hole arrangements, see FIGS. 3 and 4, is such that there are two series of aligned slots 44 disposed at right angles relative to each other with each series extending between opposite sides of the layer and through the center of the cladding layer. In addition, there is a number of series of oversize holes 45 which extend radially with respect to the center and are disposed at selected angles with respect to each other other and to the two series of slots 44. With this hole arrangement, expansion of the cladding layers 40 is permitted but confined by the two series of slots 44. While the cladding layers may be unitary, they are usually, because of their size, formed in sections 9 and 10 with the gaps between them covered in the same manner as the gaps between the liners 18, see FIGS. 9 and 10.

The blade 26 is swung 90° between its two operative positions by a motor driven rotary actuator generally indicated at 46 mounted on the outside of the diverter 10 along one side of the outlet port 10B with its shaft 47 extending across the center thereof parallel to the pivot shaft 27 and supported by bearings 48 mounted on the walls of the outlet port 10B. The actuator 46 is operable, for proper control of the gas flow as the blade is swung from one operative position to the other, to effect the changes in blade position in approximately one minute.

The links 49A of toggle joints of which there is one in the disclosed embodiment, for each member 29 of the blade reinforcing frame and which are generally indicated at 49 are connected to the shaft 47. The links 49A of each toggle joint are pivotally connected to the toggle joint link 49B which is pivotally connected to a unit, generally indicated at 50 and anchored to the appropriate one of the members 29.

Figure 11:
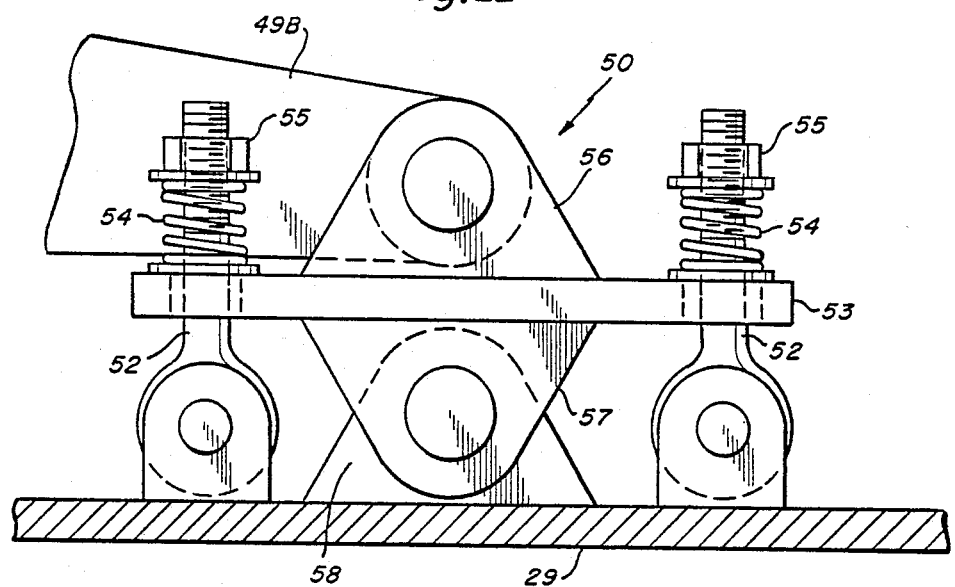
FIG. 11 is a side elevation of one of the units which connect the toggle joints to the blade.
Figure 11:
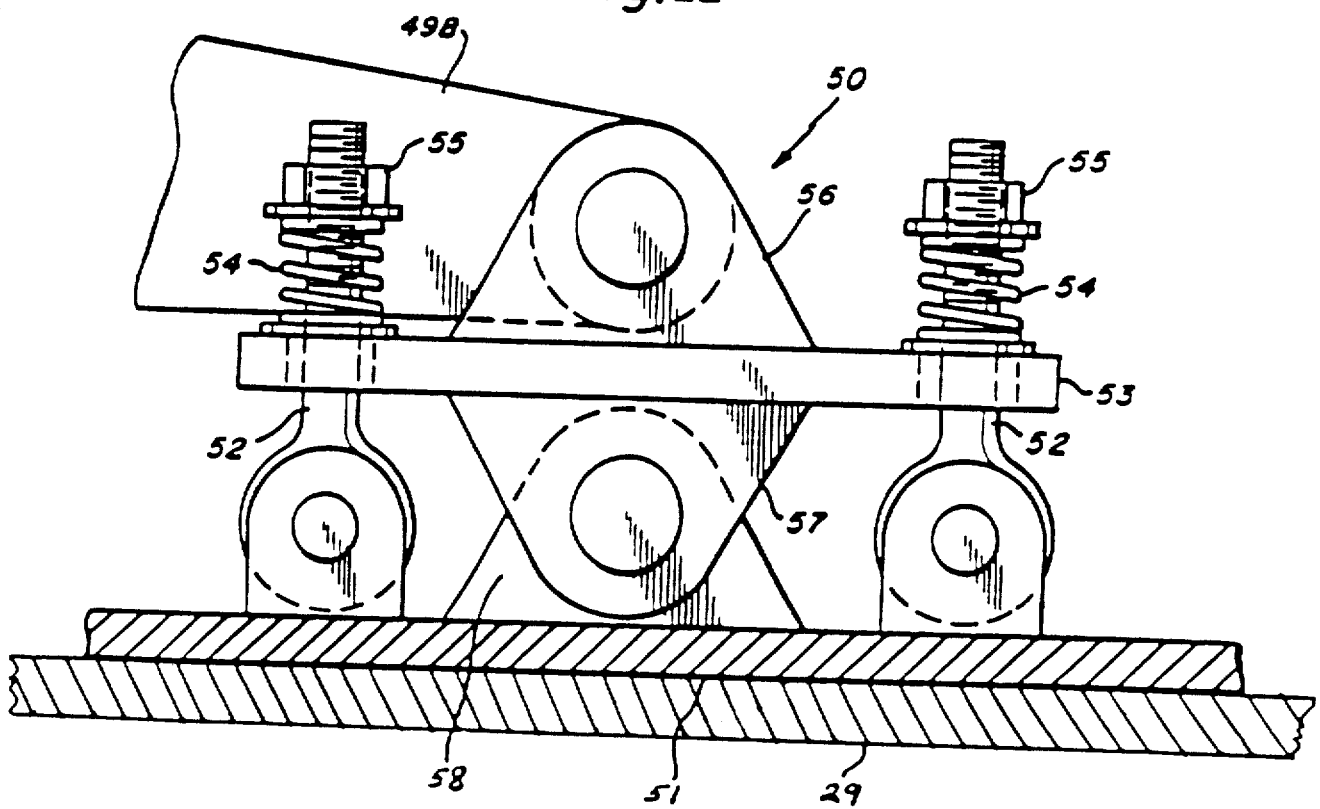

Each unit 50 see FIG. 11 has a base plate 51 anchored to a member 29 with two spaced pairs of bolts 52 pivotally connected thereto with the bolts of each pair spaced apart and extending freely through a plate 53 and through coil springs 54 backed by the plate 53 and held tensioned by nuts 55 threaded on the bolts 52. The plate 53 has an upwardly disposed pair of ears 56 between the two pairs of bolts and receptive of the appropriate one of the toggle joint links 49B which is pivotally connected thereto. The plate 53 also has a downwardly disposed pair of ears 57 pivotally connected to an ear 58 mounted on the base plate 51. Each unit functions to accommodate thermal expansion forces by enabling the pivot axis between a toggle link 47B and the ears 56 to shift as required by such forces against the opposition of the springs 52. Since the toggle joints and units 50 are directly exposed to the hot gases when diverted through the stack 12, the pivots are of a ceramic type capable of withstanding without distortion the high temperatures to which they are exposed.

As the volume of the hot gases received by the diverter is large and is under considerable pressure, typically about 25 PSI gauge pressure, it is necessary to employ air under adequate pressure to ensure zero leakage through the seals.

As may be seen in FIG. 5, corners of the closed ends of the seal holding frames 21 are in lengthwise contact with the pivot shaft 27. A motor driven blower, generally indicated at 59, held by a mount 60 secured to the diverter 10 between the outlet ports 10A and 10B is operable to deliver the necessary volume of sealing air through a conduit 61 into the space in the diverter closed by the pivot shaft 27 and the above referred to closed ends of the frames 21. The closed frame ends abutting the pivot shaft 27 have a series of ports 21A to receive such sealing air. Between the ported ends of each frame 21 and the conduit 61, there is a seat 62 extending across the interior of the diverter 10. The pivot shaft 27 has a lengthwise holder 63 for a seal 64 and is so located that when the blade 26 closes one of the outlet ports, the seal 64 engages one of the seats 62 to block the flow into the frame 21 surrounding the other outlet port with the air circulating through the frame 21 surrounding the closed port to prevent leakage through its seals.

As it usually is desirable to terminate the delivery of sealing air into the diverter 10 while the blade 26 is being swung between its operative position, the conduit 61 is provided with a damper or valve 65 which can be turned from its open position into a closed position to block the conduit 62.

In FIG. 12, the control circuitry of the diverter 10 is schematically illustrated with the lines L1, LN and L2 connected in the name order to the reversible motor 46A of the blade actuator when the normally open switches 66A of the relay 66 are closed, then to effect the operation of the motor 46A in one direction. When L1 and L2 are reversed with respect to the motor 46A, as they are when the normally open switches 67A of the relay 67 are closed, the direction of the motor is reversed.

Lines L1, LN and L2 are also separately connected to the reverible motor 65A by which the valve or damper 65 is turned between its open and closed positions. When the lines are connected to the motor 65 in the order named by the closing of the normally open switches 68A of the relay 68, the motor 65A is operated to turn the valve 65 into its closed position in order to isolate the blower 59, otherwise L1 and L2 are connected to the motor 59A in the opposite manner by the normally closed relay switches 68B.

Lines L1, LN and L2 are also connected to the fan motor 59A whenever the normally open switches 69A of the relay 69 are closed. The control circuit, generally indicated at 70 is connected to lines L1 and L2 by means of the transformer 71. The control circuit has a lead 72 provided with a stop switch and connected to parallel leads 73 and 74. In addition, the control circuit is provided with parallel limit switches 75 and 76, both of which control the operation of the parallel relays 68 and 69.

The lead 73 has a starting switch 78 and a holding lead provided with the normally open switch 67B of the relay 67, limit switches 75 and 79, a safety switch 80 in parallel with the switch 79, the normally closed switch 66B of the relay 66 and the relay 67. The lead 74 contains like components with like components other than the relay 66 and the relay switches 66B and 67B distinguished by the suffix addition "A".

It should be noted that the limit switches are in locations, not shown, to be operated by the turning of the pivot shaft 25 through 90° and that the safety switches 80 and 80A are of a torque responsive type. When the limit switches of either lead 73, 74 are closed, those of the other lead are open.

Assuming that the blade 26 is positioned to close the port 10A and is to be shifted into its position in which port 10B is to be closed, the starting switch 78 of the lead 73 is closed, limit switches 75 and 79 are closed as is the holding relay switch 67B. With the relay 67 energized the relay switch 67B in the lead 74 is opened. When the blade closes the port 10B, the limit switches 75 and 79 are opened and the limit switches 76 and 79A are closed.

From the foregoing description of the construction and operation of diverters in accordance with the invention, it will be apparent that such diverters meet all operating requirements.

We claim:

1. A gas flow diverter for use as the junction between the exhaust of a gas turbine, a stack and the inlet of a heat recovery steam generator, said diverter including a chamber having an inlet port connectable to the exhaust of the turbine, an aligned outlet port connectable to the intake of the generator and an upwardly opening outlet port connectable to the stack, insulation secured to the interior surfaces of the chamber, a blade within the chamber and provided with a pivot shaft rotatably supported by the chamber with its axis equidistant from the outlet ports, said blade shaped and dimensioned to swing between positions in which either outlet port is closed thereby and the other is opened, said blade including a frame both sides of which constitute first ledges and a central projection both sides of which constitute second ledges, sealing frames, one surrounding each outlet port and U-shaped in cross section with one side wall longer than the other and secured to the interior of the chamber with the open ends of the sealing frames opening into the chamber in the same plane, first and second seals carried by said longer and other walls, respectively, and spaced and dimensioned to be engaged by the first and second ledges, respectively, on the appropriate side of the blade frame when the blade is in a port closing position, actuating means connected to said blade and operable to swing said blade to bring the ledges thereof into and out of engagement with the seals of either sealing frame, and means to deliver sealing air into the space within either sealing frame when the seals thereof are engaged by first and second ledges of the frame of the blade.

2. The gas diverter of claim 1 in which the blade includes a reinforcement to which the frame of the blade is connected, a layer of insulation on each side of the reinforcement, cladding overlying each layer, and means connecting each cladding to the reinforcement through the underlying layer.

3. The gas diverter of claim 2 in which the reinforcement includes a plurality of spaced tubular members the ends of which are connected to the frame and which are rectangular in cross section and disposed at right angles to the pivot shaft, plates connect the tubular members to each other and to the other sides of the frame and provide air spaces underlying each layer of insulation.

4. The gas diverter of claim 3 in which the frame includes two marginal frames each of which is shaped and dimensioned to provide first and second ledges, the marginal frames connected to the reinforcement in a spaced apart relationship with the space between them closed.

5. The diverter of claim 3 in which the actuating means are toggle joints, and means pivotally connecting each toggle joint to a different one of the tubular members.

6. The diverter of claim 5 in which each of the connecting means includes a base plate connected to a tubular member, a second plate pivotally connected thereto with a toggle joint link pivotally connected thereto, and resilient means connecting the plates and yieldably opposing tilting movements of the mount in response to contracting and expanding forces exerted by the toggle joint.

7. The diverter of claim 6 in which the connecting means permit the second plate to shift longitudinally with respect to the base plate.

8. The diverter of claim 2 in which the cladding connecting means are pins anchored to the reinforcement, each cladding has a substantial number of series of holes through each of which a pin extends and is provided with a retainer overlying that hole, two series of holes in the form of slots passing through the center of the cladding and disposed at right angles to each other and a plurality of series of oversized holes each series of wich extends radially with respect to said center and each series of oversized holes is equally spaced from the others and the two series of slots.

9. The diverter of claim 1 in which the insulation secured to the interior of the chamber is in the form of abutting panels and panel retaining means pins connected to the walls of the diverter, retaining strips overlying the margin of adjacent panels through which the pins freely extend, and retainers are fixed on the exposed ends of the pins.

10. The diverter of claim 1 and means to terminate the delivery of sealing air into the chamber while the position of the blade is being changed.

11. The diverter of claim 10 and means operable at the same time to block the flow of gas from the chamber into the blower.

12. The diverter of claim 1 in which the pivot shaft is spaced from the walls of the chamber, a corner of the closed end of one side of each sealing frame is in linear contact with opposite portions of the pivot shaft and define therewith a closed zone in the chamber, a blower is mounted on the diverter and has a delivery conduit provided with an isolating damper and opening into said zone, said closed frame ends having ports, the diverter has seats, one between each of said ends and the conduit, said seats spaced 90° apart, and a seal extending lengthwise of and attached to the pivot shaft in a position to engage that one of said seats adjacent the sealing frame of the outlet port that is open.

13. A gas flow diverter for use as the junction between the exhaust of a gas turbine, a stack and the inlet of a heat recovering steam generator, said diverter including a chamber having an inlet port connectable to the exhaust of the turbine, an aligned outlet port connectable to the intake of the generator and an upwardly opening outlet port connectable to the stack, insulation secured to the interior surfaces of the chamber, a blade within the chamber and provided with a pivot shaft rotatably supported by the chamber with its axis equidistant from the outlet ports, said blade shaped and dimensioned to swing between positions in which either outlet port is closed thereby and the other is opened, said blade including a frame, a sealing frame surrounding each outlet port and secured to the interior of the chamber, said blade and sealing frames including marginal portions, those of the blade frame for engagement with those of whichever one of the sealing frames surrounds the outlet port to be closed, the engageable portions of the frames provided with complemental sealing members, and means connected to said blade and operable to swing said blade into and out of positions closing either outlet port, said blade swinging means including a reversible drive having a drive shaft extending across an outlet port, a plurality of toggle joints having links connected to said shaft, and units, one of each toggle joint and provided with a base plate connected to the blade, a second plate to which a toggle joint link is pivotally connected, and a resilient connection between said plates enabling said second plate to move relative to the base plate in response to thermal expanding forces exerted thereon by the toggle joint connected thereto.

14. The diver of claim 13 in which the base plate of each unit has two pairs of longitudinally spaced pairs of spaced bolts connected thereto, the bolts extend through oversized holes in the second plate, coil springs through which the bolts extend and which are backed by the second plate, and nuts threaded on the bolts and holding the springs compressed, and means pivotally connecting the base and second plates.

15. The diverter of claim 14 in which the bolts are pivotally connected to the base plate.

16. The gas diverter of claim 13 in which the blade includes a reinforcement to which the frame of the blade is connected, a layer of insulation on each side of the reinforcement, cladding overlying each layer, means connecting the cladding to the reinforcement, and means connecting the base plate of each unit to the reinforcement.

17. A diverter of claim 16 in which the reinforcement includes a plurality of spaced tubular members which are rectangular in cross section and disposed at right angles to the pivot shaft and the base plate of each unit is anchored to a selected tubular member.

18. The diverter of claim 16 in which the cladding connecting means are pins anchored to the reinforcement, each cladding has a substantial number of series of holes through which pins extend, two series of holes in the form of slots passing through the center of the cladding and disposed at right angles to each other, and a plurality of series of oversized holes each series of which extend radially with respect to the center of the cladding and spaced from each other and the two series of slots.

* * * * *

UNITED STATES PATENT AND TRADEMARK OFFICE
CERTIFICATE OF CORRECTION

PATENT NO. : 4,821,507

DATED : April 18, 1989

INVENTOR(S) : Bachmann et al.

It is certified that error appears in the above-identified patent and that said Letters Patent is hereby corrected as shown below:

Col. 5, line 29, after "base plate", re-insert --51--; and
  line 40, after "base plate" reinsert --51--.

In the Figures, please substitute the attached corrected Fig. 11 which properly shows unit 50 having base plate 51 anchored to member 29, as described at column 5, lines 29-48.

Signed and Sealed this

Seventeenth Day of July, 1990

Attest:

HARRY F. MANBECK, JR.

Attesting Officer     Commissioner of Patents and Trademarks